(12) United States Patent
Thornton et al.

(10) Patent No.: US 10,738,619 B2
(45) Date of Patent: Aug. 11, 2020

(54) FAN COOLING HOLE ARRAY

(71) Applicant: UNITED TECHNOLOGIES CORPORATION, Farmington, CT (US)

(72) Inventors: Lane Thornton, Meriden, CT (US); Matthew A. Devore, Cromwell, CT (US); Dominic J. Mongillo, West Hartford, CT (US); Steven Bruce Gautschi, Naugatuck, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 840 days.

(21) Appl. No.: 15/107,493

(22) PCT Filed: Jan. 2, 2015

(86) PCT No.: PCT/US2015/010010
§ 371 (c)(1),
(2) Date: Jun. 23, 2016

(87) PCT Pub. No.: WO2015/163949
PCT Pub. Date: Oct. 29, 2015

(65) Prior Publication Data
US 2016/0326883 A1 Nov. 10, 2016

Related U.S. Application Data

(60) Provisional application No. 61/928,105, filed on Jan. 16, 2014.

(51) Int. Cl.
F01D 5/18 (2006.01)
(52) U.S. Cl.
CPC .......... F01D 5/186 (2013.01); F05D 2220/32 (2013.01); F05D 2240/303 (2013.01);
(Continued)

(58) Field of Classification Search
CPC . F01D 5/18; F01D 5/186; F01D 25/12; F01D 9/065; F05D 2240/121;
(Continued)

(56) References Cited

U.S. PATENT DOCUMENTS 5,876,182 A * 3/1999 Schulte .................. F01D 5/145
415/115
5,897,294 A 4/1999 Aoyama et al.
(Continued)

OTHER PUBLICATIONS

The International Search Report and Written Opinion for PCT Application No. PCT/US2015/010010, dated Oct. 21, 2015.
(Continued)

Primary Examiner — Brian P Wolcott
Assistant Examiner — Elton K Wong
(74) Attorney, Agent, or Firm — Carlson, Gaskey & Olds, P.C.

(57) ABSTRACT

A gas turbine engine component comprises an airfoil with a suction side and pressure side extending from a leading edge to a trailing edge. There are a plurality of cooling holes adjacent the leading edge, with the cooling holes having a non-circular shape, with a longer dimension and a smaller dimension. The airfoil defines a radial direction from a radially outer end to a radially inner end, and radially outer of the cooling holes spaced toward the radially outer end, which have the longer dimension extending closer to parallel to the radial direction. Radially inner cooling holes closer to the radially inner end having the longer dimension extend to be closer to perpendicular relative to the radial direction compared to the radially outer cooling holes.

6 Claims, 3 Drawing Sheets

(52) U.S. Cl.
CPC .... *F05D 2250/14* (2013.01); *F05D 2250/312* (2013.01); *F05D 2250/313* (2013.01); *F05D 2250/314* (2013.01); *F05D 2250/324* (2013.01); *F05D 2250/38* (2013.01); *F05D 2260/202* (2013.01); *Y02T 50/673* (2013.01); *Y02T 50/676* (2013.01)

(58) Field of Classification Search
CPC ........... F05D 2240/303; F05D 2250/14; F05D 2250/312; F05D 2250/314; F05D 2250/324; F05D 2250/38; F05D 2260/202; Y02T 50/673; Y02T 50/676
See application file for complete search history.

(56) References Cited

U.S. PATENT DOCUMENTS

| | | | |
|---|---|---|---|
| 6,176,676 | B1 | 1/2001 | Ikeda et al. |
| 7,563,073 | B1 * | 7/2009 | Liang ...................... F01D 5/186 416/97 R |
| 8,070,443 | B1 | 12/2011 | Liang |
| 8,317,473 | B1 | 11/2012 | Liang |
| 8,545,180 | B1 * | 10/2013 | Liang ...................... F01D 5/186 415/115 |
| 8,572,844 | B2 | 11/2013 | Piggush |
| 2006/0083613 | A1 * | 4/2006 | Cunha ...................... F01D 5/081 416/97 R |
| 2006/0104807 | A1 * | 5/2006 | Lee .......................... F01D 5/186 415/115 |
| 2013/0071255 | A1 | 3/2013 | Yokoyama |
| 2013/0156602 | A1 | 6/2013 | Santoro et al. |
| 2014/0010632 | A1 | 1/2014 | Spangler et al. |
| 2014/0037460 | A1 * | 2/2014 | Saxer-Felici ............ F01D 5/186 416/97 R |
| 2014/0377054 | A1 * | 12/2014 | Zhang ..................... F01D 9/065 415/115 |

OTHER PUBLICATIONS

Supplementary European Search Report for European Application No. 15782652.0 dated Jan. 5, 2017.
International Preliminary Report on Patentability for International Application No. PCT/US2015/010010 dated Jul. 28, 2016.

* cited by examiner

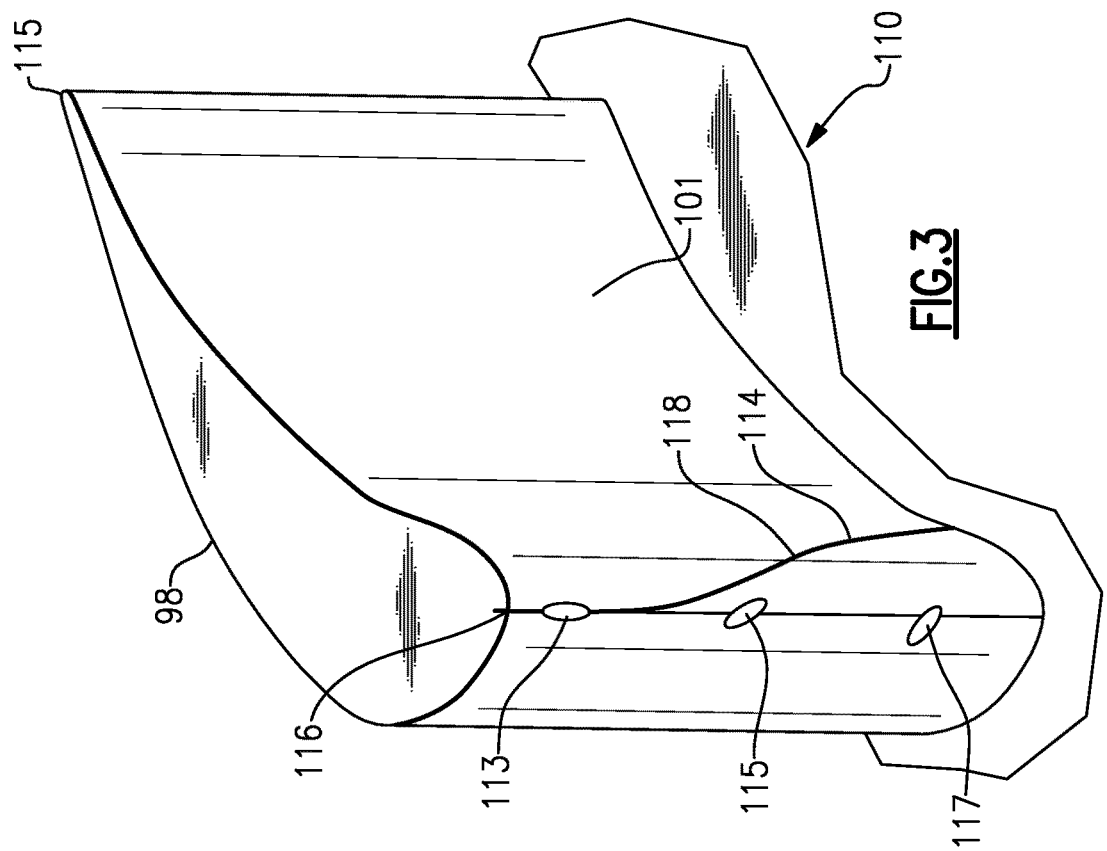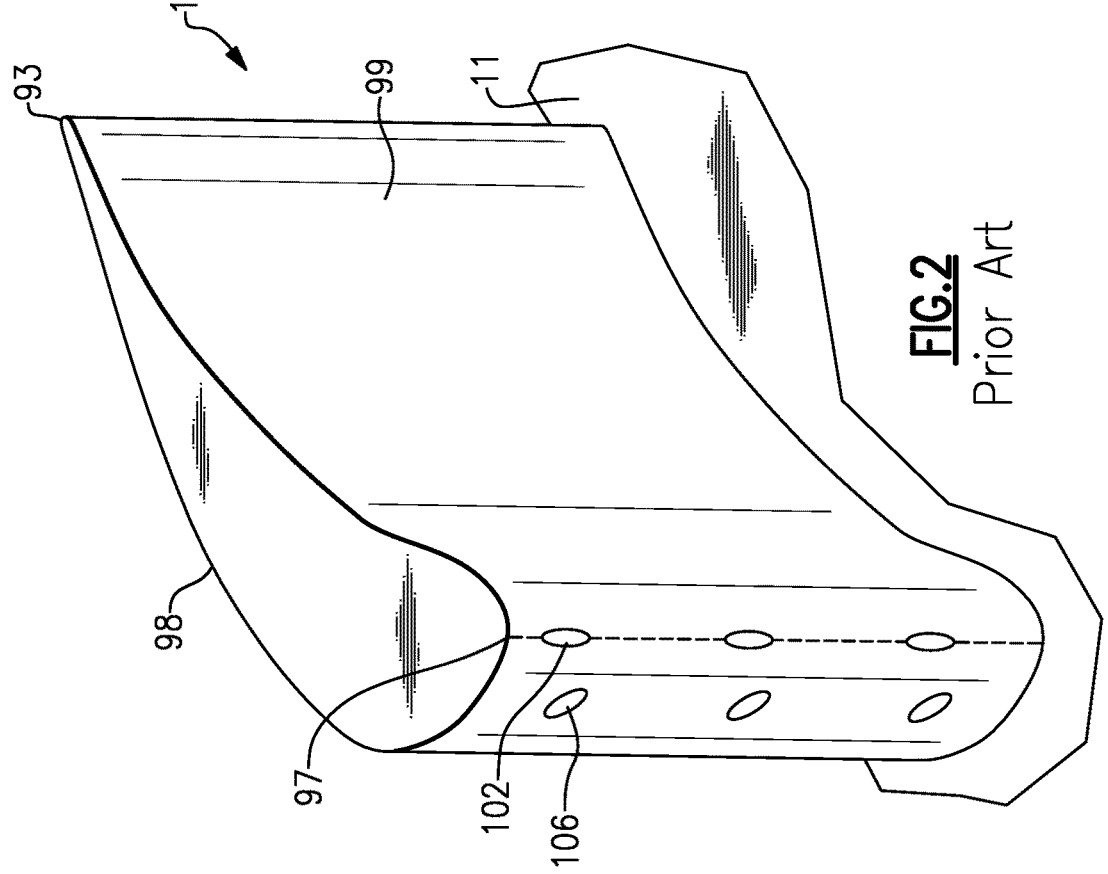

FAN COOLING HOLE ARRAY

CROSS-REFERENCE TO RELATED APPLICATION

This application claims priority to U.S. Provisional Patent Application No. 61/928,105, filed Jan. 16, 2014.

BACKGROUND OF THE INVENTION

This application relates to a cooling hole array for use adjacent a leading edge of an airfoil.

Gas turbine engines are known and, typically, include a fan delivering air into a compressor where it is compressed. The compressed air is delivered into a combustion section where it is mixed with fuel and ignited. Products of this combustion pass downstream over turbine rotors driving them to rotate.

The turbine section typically includes rotating blades and static vanes, all of which include airfoils. The airfoils are exposed to very hot temperatures and, thus, internal cooling passages are provided within the airfoils.

Airfoils extend from a leading edge to a trailing edge and have a suction and pressure side. Cooling has typically been provided adjacent the leading edge with so-called "showerhead" hole shapes. A showerhead shape has a longer dimension and a shorter dimension and the longer dimension is typically aligned with a radial direction along the airfoil.

More recently, so-called "high lift" aerodynamic airfoils have been developed. A high lift airfoil maximizes the ability of the turbine to capture energy from the working fluid, thereby reducing the need for increasing the flow of working fluid through the turbine and increasing turbine performance.

The use of showerhead cooling holes at the leading edge of high lift airfoils requires some unique characteristics at least partially because the cooling holes have typically been provided at a mechanical leading edge, whereas the actual aerodynamics in a high lift airfoil result in a distinct location of airflow split extending onto the pressure side of the airfoil and, in particular, at radially inner locations.

SUMMARY OF THE INVENTION

In a featured embodiment, a gas turbine engine component comprises an airfoil with a suction side and pressure side extending from a leading edge to a trailing edge. There are a plurality of cooling holes adjacent the leading edge, with the cooling holes having a non-circular shape, with a longer dimension and a smaller dimension. The airfoil defines a radial direction from a radially outer end to a radially inner end, and radially outer of the cooling holes spaced toward the radially outer end, which have the longer dimension extending closer to parallel to the radial direction. Radially inner cooling holes closer to the radially inner end having the longer dimension extend to be closer to perpendicular relative to the radial direction compared to the radially outer cooling holes.

In another embodiment according to the previous embodiment, the component has a platform which defines the radially inner end.

In another embodiment according to any of the previous embodiments, there is a transition zone intermediate the radially inner and radially outer cooling holes. The transition zone includes a cooling hole having a longer direction that is non-perpendicular and non-parallel to the radial dimension.

In another embodiment according to any of the previous embodiments, the transition zone includes a plurality of cooling holes which have the longer dimension defining an angle between 0 and 90° relative to the radial dimension.

In another embodiment according to any of the previous embodiments, the angle of the plurality of cooling holes in the transition zone increase as the cooling holes are radially closer to the radially inner most cooling hole.

In another embodiment according to any of the previous embodiments, the component is a turbine blade.

In another embodiment according to any of the previous embodiments, the airfoil is a high lift airfoil.

In another embodiment according to any of the previous embodiments, the high lift airfoil has a ratio of static pressure to total pressure in proximity to an airfoil surface that is greater than approximately 0.9 across a substantial portion of the airfoil surface.

In another embodiment according to any of the previous embodiments, there is a transition zone intermediate the radially inner and radially outer cooling holes. The transition zone includes a cooling hole having a longer direction that is non-perpendicular and non-parallel to the radial dimension.

In another embodiment according to any of the previous embodiments, the transition zone includes a plurality of cooling holes which have the longer dimension that define an angle between 0 and 90° relative to the radial dimension.

In another embodiment according to any of the previous embodiments, the angle of the plurality of cooling holes in the transition zone increases as the cooling holes move radially closer to the radially inner most cooling hole.

In another embodiment according to any of the previous embodiments, the component is a turbine blade.

In another embodiment according to any of the previous embodiments, the airfoil is a high lift airfoil.

In another embodiment according to any of the previous embodiments, the high lift airfoil has a ratio of static pressure to total pressure in proximity to an airfoil surface that is greater than approximately 0.9 across a substantial portion of the airfoil surface.

In another embodiment according to any of the previous embodiments, the component is a turbine blade.

In another embodiment according to any of the previous embodiments, the airfoil is a high lift airfoil.

In another embodiment according to any of the previous embodiments, the high lift airfoil has a ratio of static pressure to total pressure in proximity to an airfoil surface that is greater than approximately 0.9 across a substantial portion of the airfoil surface.

In another embodiment according to any of the previous embodiments, the airfoil is a high lift airfoil.

In another embodiment according to any of the previous embodiments, the high lift airfoil has a ratio of static pressure to total pressure in proximity to an airfoil surface that is greater than approximately 0.9 across a substantial portion of the airfoil surface.

In another embodiment according to any of the previous embodiments, a gas turbine engine comprises a turbine and a compressor, the turbine including blades and vanes. At least one of the blades and the vanes includes an airfoil with a suction side and pressure side, and extends from a leading edge to a trailing edge. A plurality of cooling holes are adjacent the leading edge. The cooling holes have a non-circular shape, with a longer dimension and a smaller dimension. The airfoil defines a radial direction from a radially outer end to a radially inner end. There is a transition zone between the radially outer end and the radially inner end. The transition zones include a plurality of cooling holes having the longer direction being non-perpendicular and non-parallel to the radial dimension, and the longer dimension for each of the plurality of cooling holes defining an angle relative to the radial dimension. The angle of the plurality of cooling holes in the transition zone increases as the cooling holes move radially closer to the radially inner end.

These and other features may be best understood from the following drawings and specification.

BRIEF DESCRIPTION OF THE DRAWINGS

FIG. 2 shows a prior art blade.
FIG. 3 shows an inventive blade.

DETAILED DESCRIPTION

Figure 1:
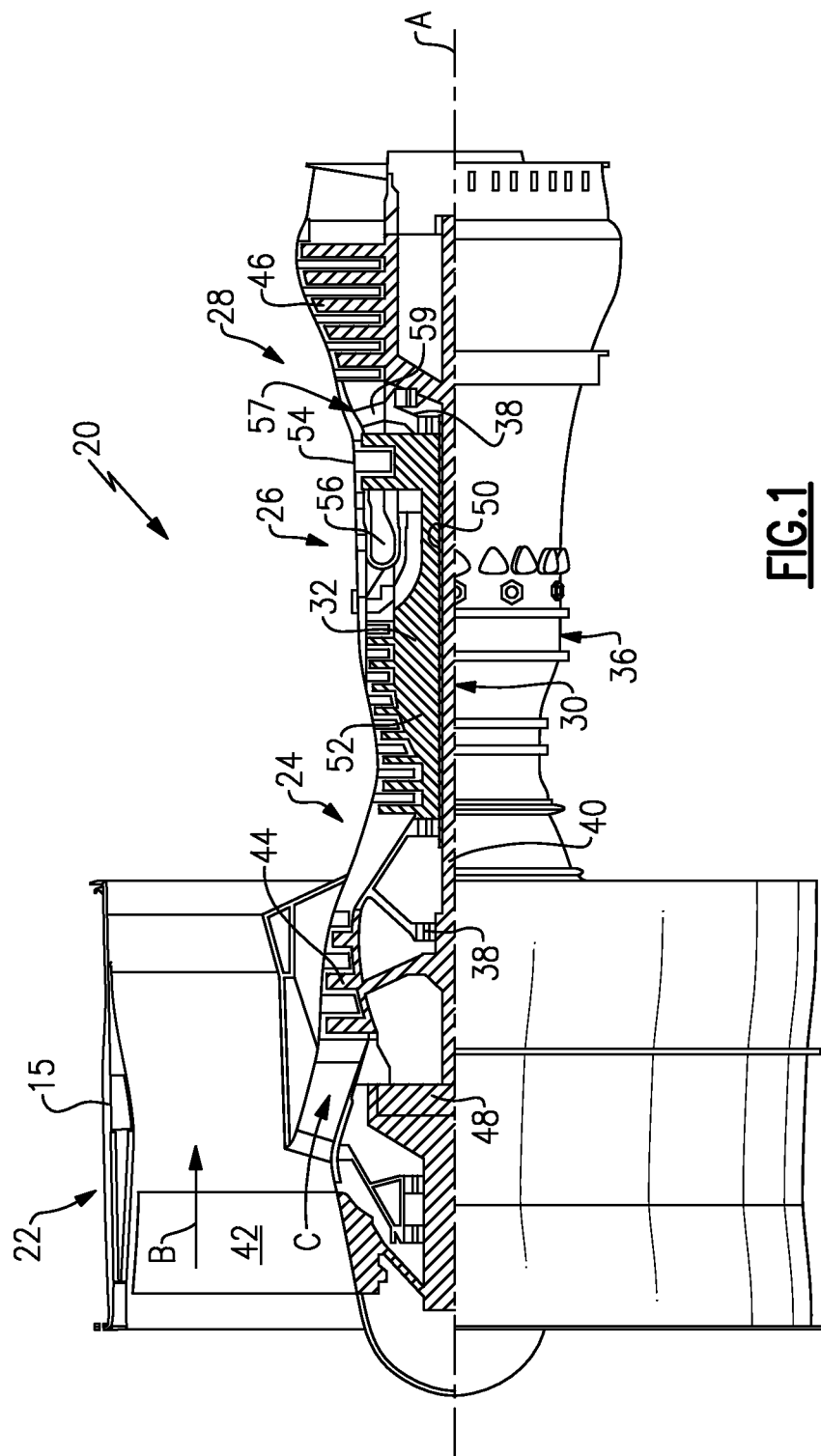
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

FIG. 2 shows a prior art airfoil 100 which may be incorporated into an engine, such as engine 20 of FIG. 1 it its turbine section. The airfoil 100 is illustrated having a suction side 98 and a pressure side 99, and extending from a leading edge 97 to a trailing edge 93. The airfoil is illustrated as a blade having a platform 11 at a radially inner end. The leading edge 97 is illustrated at the forward most end of the airfoil. A plurality of showerhead cooling holes 102 are located along this leading edge 97. So-called gill cooling holes 106 are located spaced onto the suction side 98 from the leading edge 97.

The showerhead cooling holes 102 may be defined as having a longer dimension and a shorter dimension with the longer dimension generally aligned with a radially outer direction. The gill cooling holes also have a longer dimension and a shorter dimension, however, the longer dimension in the gill holes 106 is generally perpendicular to the radial dimension.

Figure 4B:
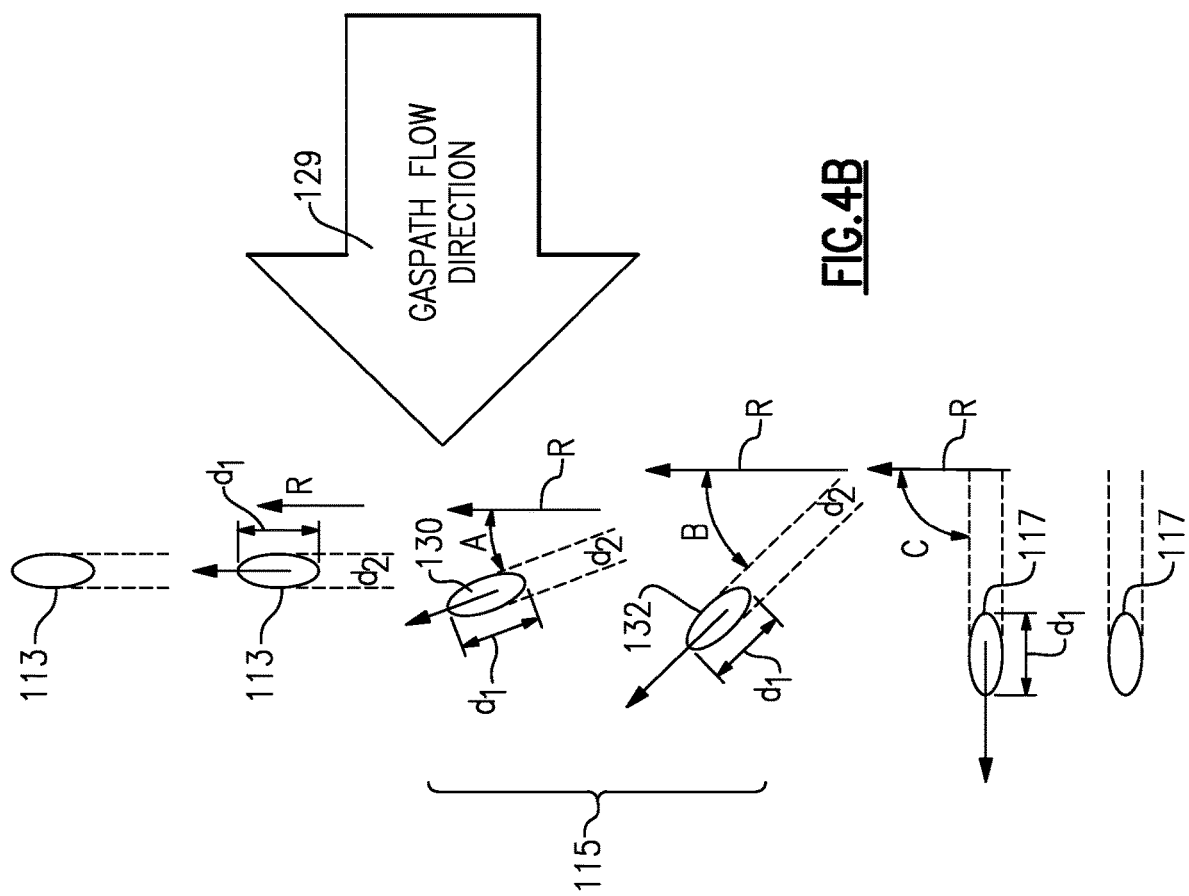
FIG. 4B schematically shows a detail of the inventive blade.
Figure 4A:
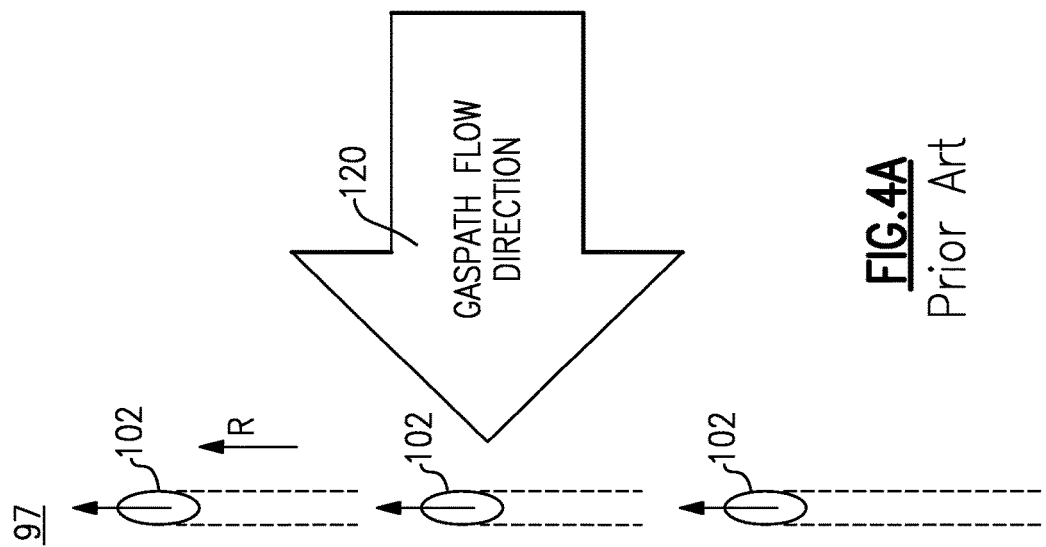
FIG. 4A shows a feature of the prior art.

FIG. 4A illustrates the showerhead cooling holes 102 at the leading edge 97. As shown, the gas flow path 120 wraps around the leading edge and carries air onto the suction side with the prior art showerhead cooling holes 102, the airflow 120, particularly at the radially inner locations, would result in flow losses from the air exiting the cooling holes 102.

As illustrated in FIG. 3, the leading edge 116 is spaced from a trailing edge 115 and the suction side 98 is spaced from the pressure side 101. However, contrary to the FIG. 2 airfoil, with this high lift airfoil, there is an aerodynamic leading edge 118 that curves away from the mechanical leading edge 116 and onto the pressure side 101. Thus, the aerodynamic leading edge has a portion 114 spaced relatively far from the mechanical leading edge 116 at radially inner locations wherein the airfoil 101 merges into the platform 111.

While the radially outer holes 113 may still be showerhead cooling holes with a longer dimension generally aligned with the radial dimension, there are transition cooling holes 115 which are spaced intermediate a showerhead direction and a "gill" direction at radially inner cooling holes 117.

As the airflow 120 extends from the pressure side around the mechanical leading edge 116, the direction of the air exiting the holes 130 and 132 will not result in the energy losses as would occur if the prior art showerhead designs were utilized.

FIG. 3 shows a high lift blade 110. A high lift blade could be defined as having an airfoil that maximizes the energy captured from the working fluid. Working fluid flowing over the airfoil surface exhibits a ratio of static pressure to total pressure in proximity to the airfoil surface that is greater than approximately 0.9 across a substantial portion of the airfoil surface.

Refer to FIG. 4B, the radially outer showerhead holes 113 having a longer dimension $d_1$ and a shorter dimension $d_2$. The longer dimension $d_1$ is generally parallel to the radial direction R. There is then a radially intermediate transition area 115 wherein the direction of the longer dimension $d_1$ of a cooling hole 130 is at an angle A with regard to the radial dimension R. As shown at 132, the angle B may increase as the location of the cooling holes extend radially inwardly through the transition zone 115. Transition zone 115 includes a plurality of cooling holes 130, 132 which have a longer dimension defining an angle between 0 and 90° relative to the radial dimension.

As shown, there are a plurality of radially inner gill cooling holes 117 which have their longer dimension $d_1$ generally perpendicular to the radial direction R. The holes 113, 130, 132 and 117 are all non-circular with a longer dimension and a shorter dimension.

With the disclosed positioning, the cooling air is more efficiently utilized than in the prior art. While the location of holes 113, 130, 132 and 117 may be at the leading edge, it is envisioned that the holes need only be adjacent the leading edge. The term "adjacent" as utilized with regard to this application is defined as within 15% of the actual mechanical leading edge along a surface length of either the pressure or suction side, as measured from the leading edge toward the trailing edge.

Stated another way, an airfoil with a suction side 98 and pressure side 101 extends from a leading edge 116 to a trailing edge 115. A plurality of cooling holes 113, 117 are adjacent the leading edge, with the cooling holes having a non-circular shape, with a longer dimension and a smaller dimension. The airfoil defines a radial direction R from a radially outer end to a radially inner end. Radially outer cooling holes 113 spaced toward the radially outer end have the longer dimension extending closer to parallel to the radial direction, than radially inner cooling holes 117, which are closer to the radially inner end. The radially inner cooling holes 117 have the longer dimension extending to be closer to perpendicular relative to the radial direction compared to the radially outer cooling holes 113.

While this application has described the orientation of the cooling holes with regard to a radial direction, in fact the orientation of the holes is selected to more closely be orientated with a main gas path flow direction at each location. However, in the disclosed embodiment, the main gas path flow direction is orientated so as to result in the hole orientation as described above relative to the radial direction.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
   an airfoil with a suction side and pressure side, and extending from a leading edge to a trailing edge;
   a plurality of cooling holes adjacent the leading edge, with said cooling holes having a non-circular shape, with a longer dimension and a smaller dimension, and said airfoil defining a radial direction from a radially inner end to a radially outer end, and radially outer of said cooling holes spaced toward said radially outer end having said longer dimension extending closer to parallel to said radial direction, and radially inner cooling holes closer to said radially inner end having said longer dimension extending to be closer to perpendicular relative to said radial direction compared to said radially outer cooling holes;
   wherein said component has a platform which defines said radially inner end;
   wherein there is a transition zone intermediate said radially inner and radially outer cooling holes with said transition zone including a cooling hole having a longer dimension that is non-perpendicular and non-parallel to said radial direction;
   wherein said transition zone includes a plurality of cooling holes which have said longer dimension defining an angle between 0 and 90° relative to said radial direction; and
   wherein the angle of said plurality of cooling holes in said transition zone increasing in said cooling holes radially closer to said radially inner most cooling hole.

2. The gas turbine engine component as set forth in claim 1, wherein said component is a turbine blade.

3. The gas turbine engine component as set forth in claim 2, wherein said airfoil is a high lift airfoil.

4. The gas turbine engine component as set forth in claim 3, wherein said high lift airfoil has a ratio of static pressure to total pressure in proximity to an airfoil surface that is greater than approximately 0.9 across a substantial portion of the airfoil surface.

5. The gas turbine engine as set forth in claim 4, wherein said high lift airfoil has an aerodynamic leading edge that curves away from a mechanical leading edge in a direction moving radially inwardly and onto a said pressure side of said airfoil.

6. The gas turbine engine as set forth in claim 3, wherein said high lift airfoil has an aerodynamic leading edge that curves away from a mechanical leading edge in a direction moving radially inwardly and onto a said pressure side of said airfoil.

\* \* \* \* \*